United States Patent

Gommel et al.

[11] Patent Number: 6,106,669
[45] Date of Patent: Aug. 22, 2000

[54] PROCESS FOR THICKENING A FIBROUS PULP SUSPENSION

[75] Inventors: Axel Gommel, Ravensburg; Paul-Wilhelm Sepke, Ravensburg-Weissenau, both of Germany

[73] Assignee: Voith Sulzer Papiertechnik Patent GmbH, Ravensburg, Germany

[21] Appl. No.: 09/035,335

[22] Filed: Mar. 5, 1998

[30] Foreign Application Priority Data

Mar. 6, 1997 [DE] Germany ................ 297 04 062 U
Apr. 16, 1997 [DE] Germany ................ 197 15 783

[51] Int. Cl.$^7$ ............................................. D21C 5/00
[52] U.S. Cl. ................... 162/56; 162/56; 162/317; 162/60; 162/318; 210/401; 210/402; 210/386; 209/17
[58] Field of Search ................. 162/55, 60, 317, 162/318, 329, 323, 56, 301, 210, 214, 289, 357, 372, 373, 342, 197; 210/784, 402, 404, 780, 767, 406; 68/43, 22 R; 209/12.1, 17; 8/156

[56] References Cited

U.S. PATENT DOCUMENTS

| | | |
|---|---|---|
| 1,421,364 | 7/1922 | Allen . |
| 2,278,525 | 4/1942 | Rich et al. . |
| 4,501,040 | 2/1985 | Biondetti et al. ........................ 8/156 |
| 4,686,005 | 8/1987 | Biondetti et al. ........................ 162/60 |
| 4,722,793 | 2/1988 | Seifert et al. ........................ 210/401 |
| 4,750,340 | 6/1988 | Anderson . |
| 4,995,988 | 2/1991 | Ahlgren . |
| 5,133,832 | 7/1992 | Gilkey ........................ 162/4 |
| 5,382,327 | 1/1995 | Seifert et al. ........................ 162/317 |
| 5,384,014 | 1/1995 | Bliss ........................ 162/317 |
| 5,591,336 | 1/1997 | Seifert et al. ........................ 210/386 |

FOREIGN PATENT DOCUMENTS

| | | |
|---|---|---|
| 1540383 | 8/1968 | France . |
| 138322 | 3/1902 | Germany . |
| 7519093 | 4/1986 | Germany . |
| 94/08088 | 4/1994 | WIPO . |
| 96/08600 | 3/1996 | WIPO . |
| 96/08660 | 3/1996 | WIPO . |

OTHER PUBLICATIONS

Copy of a German Search Report dated Oct. 6, 1997 prepared in connection with German Patent Application No. 197 15 783.1.

Copy of a European Search Report dated Dec. 10, 1997 prepared in connection with European Patent Application RS 98739 DE.

Primary Examiner—Stanley S. Silverman
Assistant Examiner—José S. Fortuna
Attorney, Agent, or Firm—Greenblum & Bernstein, P.L.C.

[57] ABSTRACT

A process for thickening a fibrous pulp suspension by guiding the suspension between a rigid first face and a flexible second face that move in relation to each other and form a converging draining gap, where the first face and/or the second face is/are water permeable, and where the process includes providing the suspension to be drained, forming from the suspension a fibrous pulp layer with a solid matter content of at least about 4% on at least one of the first face and the second face, guiding the fibrous pulp layer into the draining gap, applying a pressure differential in the draining gap via the second face to thicken the fibrous pulp layer, the pressure differential being formed by stretching the second face and pressing the first face and the second face toward each other to drain water from the fibrous pulp layer, and transporting the thickened fibrous pulp from the draining gap.

35 Claims, 3 Drawing Sheets

PROCESS FOR THICKENING A FIBROUS PULP SUSPENSION

CROSS-REFERENCE TO RELATED APPLICATION

The present invention claims the priority under 35 U.S.C. § 119 of German Application No. 197 15 783.1 filed Apr. 16, 1997, and of German Application No. 297 04 062.6 filed Mar. 6, 1997, the disclosures of which are expressly incorporated by reference herein in their entireties.

BACKGROUND INFORMATION

1. Field of the Invention

The invention relates to a process for thickening a fibrous pulp suspension by guiding the suspension between a rigid first face and a flexible second face that move in relation to each other and form a converging draining gap where at least one of the first face and the second face is water permeable.

2. Discussion of Background Information

Processes of this type are used either to increase the pulp density of a fibrous pulp suspension, or to remove undesirable components from the fibrous pulp suspension by washing. These processes are associated with each other because draining naturally is necessary to wash a fibrous pulp suspension. Washing processes generally start with relatively low initial pulp densities (such as 1–3%). However, the effectiveness of a washing process is a function of other parameters as well, and not only of the increase in pulp density.

Such processes can be carried out with various known devices for thickening a fibrous pulp suspension. These include drum thickeners, a wide variety of screen (sieve) presses, and filter presses.

In a screen press, the fibrous pulp suspension is introduced and pressed between a screen and a roll, or between two screens, so that water is expelled. The suspension may be introduced either with a material container (a chest) that provides the suspension in the region of the screen or screens, or by a head box which forms a free jet of suspension material. For technical reasons, such as sealing problems, a material container cannot be used when suspension pulp densities are too low.

Drum thickeners form a fibrous web on the outside surface of a drum that dips into the suspension, and this fibrous web is drained into the interior of the drum. The suspension can have a relatively low pulp density. Due to the circumferential movement of the drum, the fibrous web is transported out of the suspension container, and can be removed as a thickened pulp. It then often is an acceptable material for further processing. Other procedures have been carried out for further increasing the pulp density of the pulp that has come out of the suspension and adheres to the drum. In particular, couch rolls may be used, which impart additional pressure on the fibrous web. On the other hand, a revolving belt may be pressed against the web, as disclosed in U.S. Pat. No. 2,278,525 or in WO 94/08088. As a general rule, such measures do achieve further increases in pulp densities, but the increases often are slight, and these pulp density increases may be reduced in later processing, for example by remoistening as a fibrous pulp belt emerges from a nip.

In the drum thickener disclosed in U.S. Pat. No. 1,421,364, a vat is completely filled with suspension during operation. The polygonal outer surface of the drum conveys the thickened pulp out along arched sealing faces.

WO 96/08600 describes another draining device. It likewise contains a rotating drum with a permeable surface. On a portion of its circumference, the drum is enveloped by an impermeable plastic belt. A suspension is sprayed with the aid of a head box into the gap formed between the drum and the plastic belt. A vacuum is applied from the inside of the drum in the region where the pulp jet reaches the drum wall. Such a machine is very expensive to manufacture and operate.

U.S. Pat. No. 4,750,340 discloses another device suitable for pulp thickening, with a rotary driven, perforated drum that is surrounded by an arched plate which is fixed to the drum in a slightly eccentric manner. As a result, a nip is formed between the drum and the wall, into which an already pre-thickened pulp is introduced by way of a feed worm drive. Such a device also is very costly and it is particularly suited for higher initial pulp densities.

SUMMARY OF THE INVENTION

To provide a favorable draining capacity with a high degree of operational safety, a process is provided for thickening a fibrous pulp suspension by guiding the suspension between a rigid first face and a flexible second face that move in relation to each other and form a converging draining gap, where the first face and/or the second face is water permeable, and where the process includes providing a suspension to be drained, forming from the suspension a fibrous pulp layer with a solid matter content of at least about 4% on at least one of the first and second faces, guiding the fibrous pulp layer into the draining gap, and thickening the fibrous pulp layer in the draining gap by stretching the second face and by pressing the first face and the second face toward each other to drain water from the fibrous pulp layer. A considerable advantage of this process is that web thickening is carried out on a fibrous pulp layer that already has been formed and whose pulp density is relatively high. Moreover, the dry matter content is uniformly distributed over the thickness of the fibrous pulp layer. However, the fibrous pulp layer does not have to be absolutely uniform, as in a paper making machine. Rather, depending on additional conditions, the pulp material can exist as a torn layer having flat pieces.

The process can be carried out with a screen press. A pulp density of the fibrous pulp layer of at least about 4% dry matter content is necessary for the use of a material chest (container), which is a relatively simple structure having favorable energy consumption.

In instances where the present invention thickens a suspension having less than 4% dry matter content, a pre-thickening process can be used. Where a pre-thickening process is employed, the same machine can be used on which the actual thickening occurs. If washing of a paper fibrous pulp is intended to be carried out according to the process of the invention such that undesirable pulp components along with the expressed fluid will be removed, then a low initial pulp density is particularly advantageous.

The following example represents an advantageous washing process that uses the invention, in combination with a pre-draining process: A suspension is supplied for pre-draining that has a pulp density of between approximately 0.5% and 2%. In contrast with conventional processes, the parameters of the pre-draining process are selected so that a relatively low level of de-ashing occurs (i.e., a high retention remains), while keeping in mind that pre-draining occurs on faces that are not moving in relation to each other. For example, a material with relatively high dry matter content (measured in g/m² or G.S.M) may be used. For instance, the de-ashing effect decreases significantly at G.S.M. above 40 g/m² (oven-dry). In contrast, with other processes de-ashing is relatively great at the pre-draining stage, because it can be achieved with particular ease due to the large quantities of water drained.

After the pre-draining stage, quite intense de-ashing is achieved in the draining gap where faces that move relative to each other impart shear forces to the fibrous web, even with higher pulp densities such as those above 4%. An advantage of the invention lies in the fact that due to the higher pulp density and the compactness of the pulp, fibers can be retained in the draining gap, and in contrast to the washing of thin pulp, can be retained in the pre-draining region.

This new process also permits the further improvement of the known, effective and reliable process of drum thickening. Pre-draining can be carried out by dipping a perforated drum into a suspension, where a fibrous pulp accumulates on the perforated outside of the drum. With the aid of drum rotation, the forces that arise are sufficient to transport the pre-drained fibrous pulp out of the suspension. In the adjoining draining gap, a screen, a belt, or a press shoe is positioned such that relative movement occurs between the drum wall and the screen, for instance. The layer of the fibrous pulp disposed between them can be loosened and torn by shearing forces.

With regard to drum thickening, a further advantage of the new process lies in the upward movement of the pre-drained fibrous pulp before it enters the draining gap. Specifically, the portions of the pulp having lower densities, such as those found on the side of the fibrous pulp layer away from the drum face, drain away by themselves and do not reach the draining gap. Consequently, the fibrous pulp in this region is pre-drained in a relatively homogeneous manner. Among other things, this is favorable for the formation of small rolls, as described below.

Depending on operational conditions, it is possible for the fibrous pulp layer to tear in the draining gap and to form agglomerates, which then undergo a rolling motion. This rolling motion leads to a particularly effective compaction of the fibrous pulp. In many instances, the diameter of the small rolls or agglomerates thus formed become greater than the thickness of the surrounding fibrous pulp layer. Consequently, press action in the draining gap may concentrate particularly on the small rolls, contributing to increased draining of the small rolls. If the second face of the draining gap also is chosen to be water permeable, water can flow away into a later processing region (viewed in terms of the run direction of the first face, i.e., drum face), and can flow back again through the second face. Further, since the fibrous pulp layer may be torn, the water to be drained may penetrate through the tears into the first face. Water removal from the second face is therefore quite simple. The draining gap or the perforated part of the second face can advantageously be positioned near the apex of the second face, so that water may flow away unhindered in the run direction (of the first face). Moreover, the small rolls that are forcefully compressed by external pressing forces do not absorb water and remoistening remains low.

According to the invention, it also is possible to form such small rolls without additional vacuum being applied in the thickening region.

At the beginning of the process, the suspension to be thickened may have a very low solids content, e.g. below 1%. According to the process, a thickened fibrous pulp with a solids content of between 20 and 35% can nevertheless be produced, meaning a quantitatively significant amount of water has been removed. For this reason, the process is suitable to effectively wash undesirable components out of the fibrous pulp during the draining of the suspension.

The present invention provides a process for thickening a fibrous pulp suspension by guiding the suspension between a rigid first face and a flexible second face that move in relation to each other and form a converging draining gap, where the first face and/or the second face is/are water permeable, and where the process includes providing the suspension to be drained, forming from the suspension a fibrous pulp layer with a solid matter content of at least about 4% on at least one of the first face and the second face, guiding the fibrous pulp layer into the draining gap, applying a pressure differential in the draining gap via the second face to thicken the fibrous pulp layer, the pressure differential being formed by stretching the second face and pressing the first face and the second face toward each other to drain water from the fibrous pulp layer, and transporting the thickened fibrous pulp from the draining gap. The fibrous pulp layer may have a solid matter content of at least 8% upon entering the draining gap. Moreover, the second face may be perforated and may be a screen belt. Alternatively, the second face may be water impermeable. The surface of the second face may be designed to increase frictional resistance with the fibrous pulp layer. The first face may be water permeable.

The process of the present invention also may include providing a thin pulp suspension composed of the fibrous pulp suspension to be drained, transporting the thin pulp suspension by rotational movement of a third face, pre-draining the thin pulp suspension between the third face and one of the first face and the second face to produce the fibrous pulp layer where at least one of the first face, the second face and the third face is water permeable, moving the third face and the one of the first face and the second face at substantially the same speed during pre-draining, and guiding the fibrous pulp layer into the converging draining gap. The thin pulp suspension may have a solid matter less than or equal to 2%. Moreover, the fibrous pulp layer produced during pre-draining having a pulp density of at least 40 g/m² (oven dry). Further, the first face may be cylindrical and it may be a horizontally arranged cylindrical screen drum. A vacuum may be applied in a suction zone that follows the draining gap. Additionally, the stretched flexible belt may be essentially stationary, and the process may include moving the first face to produce relative movement between the first face and the second face. The second face may include a flexible belt, the process may involve moving the flexible belt at a speed of less than 10 meters per minute. Further, the flexible belt may pass a cleaning device during processing.

The present invention also provides a process for thickening a fibrous pulp suspension by guiding the suspension between a rigid first face and a flexible second face that move in relation to each other and form a converging draining gap where the process includes providing a thin pulp suspension composed of the fibrous pulp suspension to be drained, transporting the thin pulp suspension by rotational movement of a third face, pre-draining the thin pulp suspension between the third face and one of the first face and the second face to produce a fibrous pulp layer where at least one of the first face, the second face and the third face is water permeable, moving the third face and the one of the first face and the second face at substantially a same speed during pre-draining, guiding the fibrous pulp layer into the converging draining gap, applying a pressure differential in the draining gap via the second face to thicken the fibrous pulp layer where the pressure differential is formed by stretching the second face and pressing the first face and the second face toward each other to drain water from the fibrous pulp layer, and transporting the thickened fibrous pulp from the draining gap.

The fibrous pulp layer may have a solid matter content of at least about 4% upon entering the draining gap. Moreover, the second face may be perforated and may be a screen belt. Alternatively, the second face may be water impermeable. Further, the second face may have a surface that increases frictional resistance with the fibrous pulp layer. The first face may be water permeable. The thin pulp suspension may have a solid matter less than or equal to 2%. Further, the fibrous pulp layer produced during pre-draining may have a pulp density of at least 40 g/m. Moreover, the first face may be cylindrical and may be a horizontally positioned cylindrical screen drum. A suction zone may be provided following the draining gap. The stretched flexible belt may be essentially stationary, and the process may include moving the first face to produce relative movement between the first face and the second face. Moreover, the second face may include a flexible belt, and the flexible belt may pass a cleaning device during processing.

The present invention also provides a device for thickening a fibrous pulp suspension that includes a rigid first face and a flexible second face, where at least one of the rigid first face and the flexible second face is water permeable, there the fibrous pulp suspension is deposited on the rigid first face and/or the flexible second face to form a fibrous pulp layer, where the rigid first face and the flexible second face move in relation to each other and form a converging draining gap for receiving the fibrous pulp layer, and where the flexible second face is stretchable to press the flexible second page toward the rigid first face to drain water from the fibrous pulp layer. A rotating screen belt may include the flexible second face. The device also may include a third face that transports a thin pulp suspension composed of the fibrous pulp suspension to the draining gap, the third face may be adapted to receive the thin pulp suspension and to move at substantially the same speed as either the rigid first face or the flexible second face. Moreover, a horizontally arranged cylindrical screen drum may include the rigid first face. Further, a rotating cylinder may include the third face.

Further, the aforementioned and following characteristic features of the present invention can be used not only in the described combinations, but also in other combinations or alone, without departing from the scope of the invention. Further embodiments and advantages can be seen from the detailed description and the accompanying Figures.

BRIEF DESCRIPTION OF THE DRAWINGS

The present invention is further described in the detailed description which follows, in reference to the noted drawings by way of non-limiting examples of preferred embodiments of the present invention, wherein the same reference numerals represent similar parts throughout the drawings, and wherein.

DETAILED DESCRIPTION OF THE INVENTION

Figure 1:
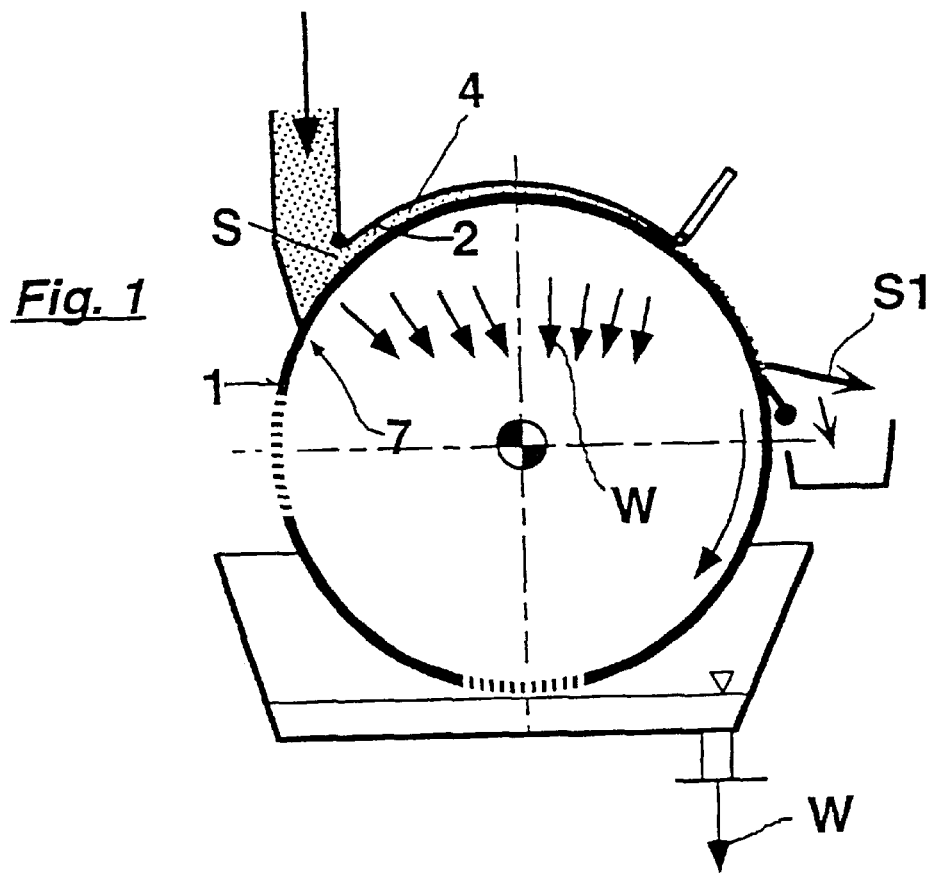
FIG. 1 schematically illustrates the process of the present invention in conjunction with a drum thickener.

The particulars shown herein are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawing making apparent to those skilled in the art how the several forms of the invention may be embodied in practice.

FIG. 1 schematically represents the process of the present invention. By way of non-limiting example, the process is illustrated in FIG. 1 in conjunction with a thickening drum. However, as noted above, other devices can be used in conjunction with the process of the invention. In FIG. 1, the suspension to be thickened is supplied into a material container (not shown) and flows downward onto perforated drum 7, as indicated by the arrow. Only a portion of the holes of this drum are illustrated. The suspension is immediately drained against the outside face of perforated drum 7 so that a fibrous pulp layer S is formed which travels into draining gap 4, due to the rotational movement of perforated drum 7. Draining gap 4 is formed between a rigid first face 1 (on the outer surface of perforated drum 7) and a flexible second face 2. According to the invention, fibrous pulp layer S has a pulp density of at least about 4% upon entry into draining gap 4. However, a value that lies considerably above 4% can be achieved if the suspension to be thickened, e.g., in the material container has a higher density (i.e., a higher consistency). It is known that screen (i.e., sieve) presses having material containers operate particularly well when suspension pulp densities are relatively high.

Second face 2 is stationary, but the rotational movement of first face 1 results in relative movement between the two faces, resulting in significantly improved draining. It is advantageous for second face 2 to be composed of a flexible, stretched belt, particularly because this permits a continuous pressure differential to be employed in draining gap 4. With a fibrous pulp layer having different thicknesses, a belt of this kind can be displaced and pressure can be easily adjusted. However, one or a number of rigid faces may be employed, provided they have suitable shapes and surfaces. After passing through the thickening region, a thickened pulp S1 is separated from face 1 at a doctor (scraper), for example. If second face 2 also is water permeable, and it is used for a water removal, the final dry matter content of the pulp can be further increased. Depending on the choice of operating parameters, higher pulp densities (of approximately 30%) or lower pulp densities (of approximately 15 to 20%) for the thickened fibrous pulp can be attained.

Figure 2:
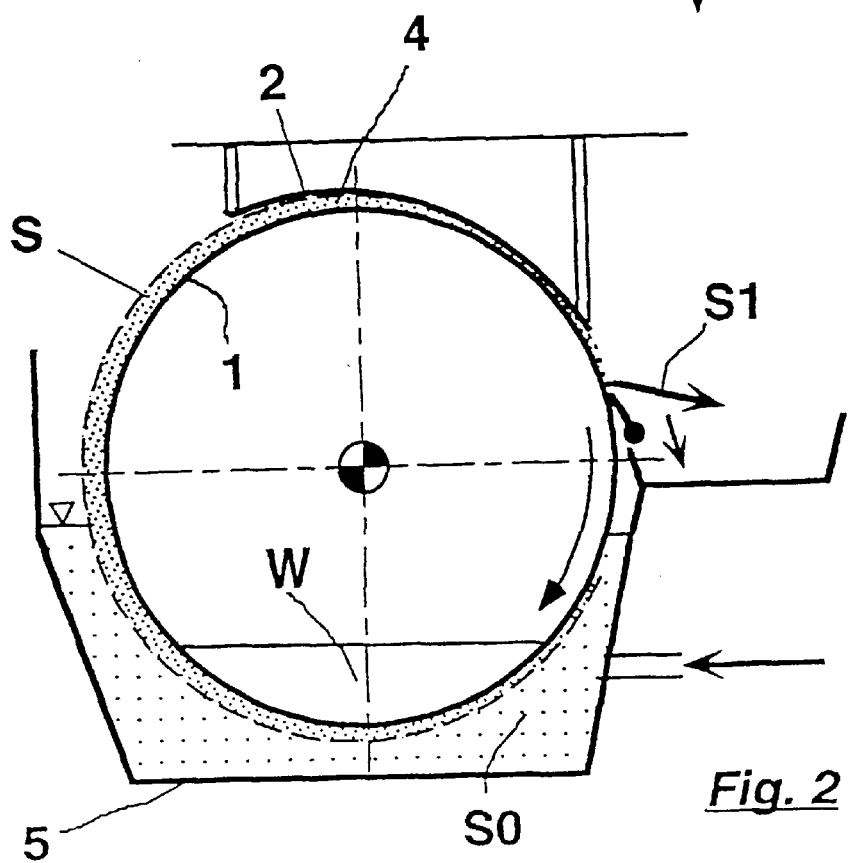
FIG. 2 schematically illustrates the process of the present invention in conjunction with another drum thickener.

In FIG. 2, the first face 1 of the thickening device is depicted in conjunction with a cylindrical, perforated screened drum (i.e., a sieve body). The openings of the drum are not shown. Preferably, the openings are part of a screen belt or cloth stretched over a rotatable foundation. The screened cylinder or drum is partially submerged into a suspension vat 5, which during process operation is filled to a certain level with the suspension to be thickened. In the example depicted in FIG. 2, the suspension is a thin pulp SO with a pulp density of less than 4%, although in other circumstances the suspension may have a pulp density of 4% or more.

Due to the hydrostatic pressure of the suspension, thin pulp SO is drained against face 1 of the immersed part of the screened drum, such that water W flows into the drum and can be removed, for example, in an axial direction. As a result of the rotational movement of the drum, a pre-thickened fibrous pulp layer adheres to face 1 as it emerges from the basin and travels into draining gap 4, which is composed of face 1 and face 2.

Although the device depicted in FIG. 2 employs simple machinery, when the process according to the invention is used, quite a large quantity of water can be removed from the pulp.

If higher throughput capacity or a higher dry matter content is desired, the process can be improved with an applied vacuum, in addition to pre-draining that occurs due to hydrostatic pressure. To that end, a suction box can be provided on the inside of the drum face to aspirate away the filtrate at stationary locations. This use of a suction box is known and therefore is not shown. A suction box also may be provided in the region directly downstream of the draining gap. At such locations, the water between the screen openings which would lead to remoistening can be aspirated away.

In other instances, it may be advantageous to divide up the drum or the filter disk into sections, and to apply vacuum to these sections by way of a central master filter valve. The finer the sectioning of the drum, the more precisely and effectively the vacuum can be used. This technique is known from the production of disk filters.

Figure 3:
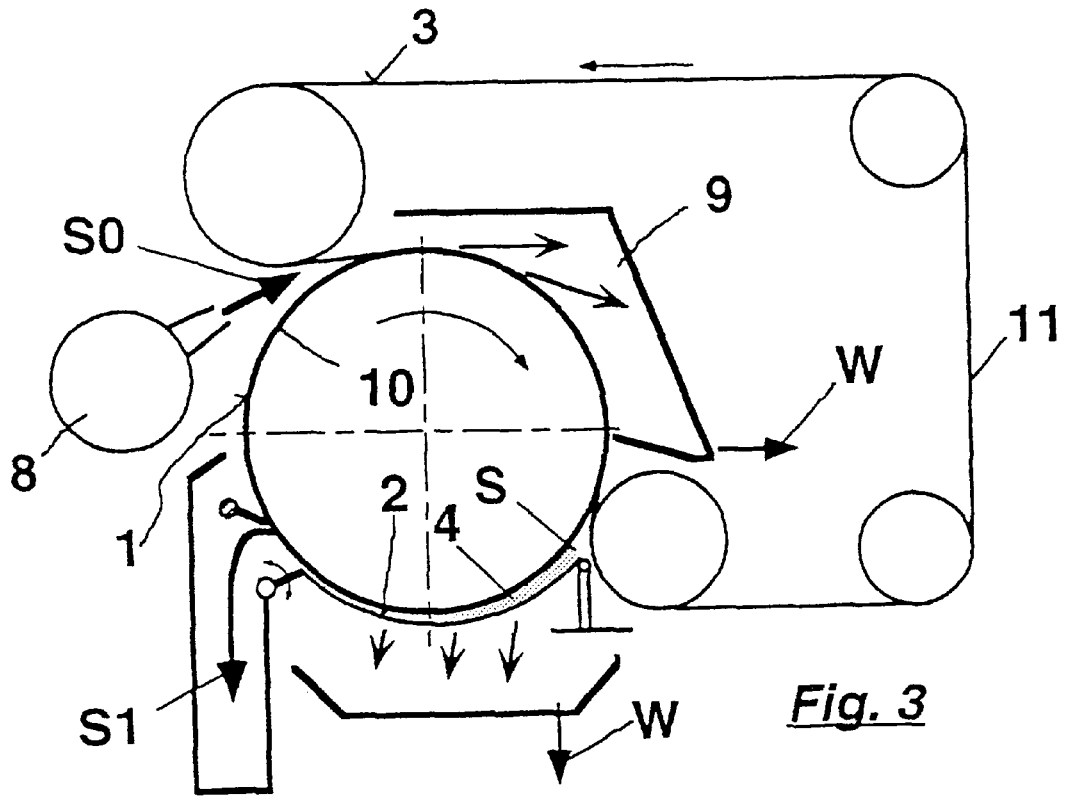
FIG. 3 schematically illustrates the process of the present invention in conjunction with a draining press including a continuous screen.

The draining device shown in FIG. 3 permits both thickening of the fibrous pulp layer S, and a pre-draining process, in order to produce the required consistency for the fibrous pulp layer. In many cases, the starting material should be made with a relatively thin suspension, e.g. a pulp density of between 1 and 2%, either because the suspension was reduced due to previous processing steps, or because a washing process should be carried out which operates optimally with a low initial pulp density. The draining device is composed of a rigid first face 1 on an impermeable cylinder 10 and a flexible second face 2, and a draining gap 4 is formed between these two faces. Second face 2 is water permeable. Furthermore, a third face 3 is formed on a revolving continuous screen belt (sieve) 11, which winds around a portion of the circumference of closed or impermeable cylinder 10.

Through the use of head box 8, a thin pulp SO is sprayed in a free jet between first face 1 and third face 3. At this time and thereafter, a considerable quantity of water passes through third face 3 and is spun into water chamber 9. As a result, a fibrous pulp layer S with the required minimum pulp density is produced against rigid first face 1. The fibrous pulp layer travels into draining gap 4, in which can be found the above-described mechanisms. Flexible second face 2 can be disposed on a screen belt, which is pressed toward rigid first face 1 in cooperation with a rotating linkage. After the fibrous pulp emerges from draining gap 4, it is removed from first face 1 as thickened pulp S1 by a doctor, for example. Pulp thickening can be further improved if a perforated cylinder is used instead of the impermeable cylinder 10.

Figure 4:
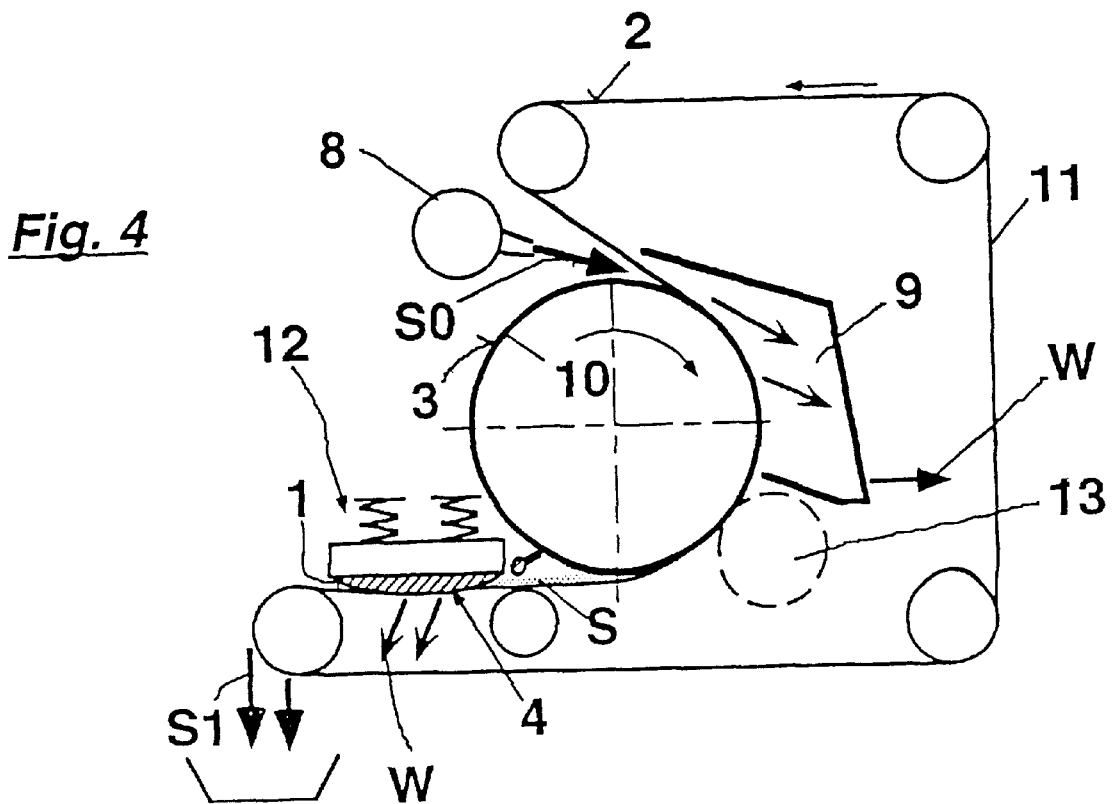
FIG. 4 schematically illustrates the process of the present invention in conjunction with another draining press including a continuous screen.

The draining device shown in FIG. 4 includes a pre-draining structure similar to that depicted in FIG. 3. In contrast with the structure of FIG. 3, however, the third face 3 is formed on the closed cylinder 10, and the flexible second face 2 is composed of a continuous screen 11 which partially winds around the circumference of cylinder 10. Continuous screen 11 guides fibrous pulp layer S away from the cylinder into a draining gap 4 which is removed from the cylinder.

In FIG. 4, the draining gap 4 is formed between continuous screen 11, which includes flexible second face 2, and an arched shoe 12 fixed in a stationary manner. The continuous belt may move at a speed of 10 meters per minute or less. Arched shoe 12 includes rigid first face 1, and is pressed against continuous screen 11. Draining action can be further improved by the perforation of cylinder 10. Moreover, draining action also may be improved with the use of a press roll 13, as indicated in FIG. 4 by dashed lines.

Figure 5:
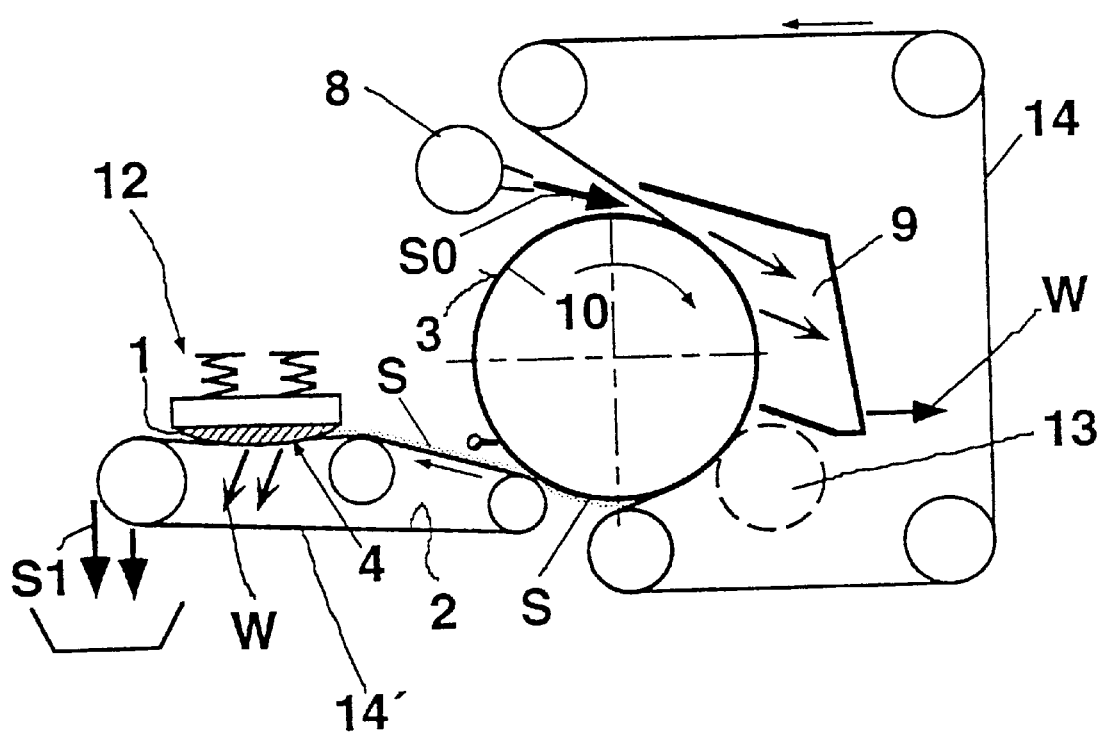
FIG. 5 schematically illustrates the process of the present invention in conjunction with yet another draining press including two continuous screens.

The process also can be varied. In the example shown in FIG. 5, for instance, flexible second face 2 is composed of two continuous screens (sieves) 14, 14'. The first continuous sieve 14, in conjunction with face 3, is used for pre-draining, i.e., for the formation of fibrous pulp layer S. Draining gap 4, in turn, is formed between the second continuous sieve 14' and stationary, fixed, arched shoe 12.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the invention in its aspects. Although the invention has been described herein with reference to particular materials and embodiments, the invention is not intended to be limited to the particulars disclosed herein; rather, the invention extends to a functionally equivalent structures, methods and uses, such as are within the scope of the appended claims.

What is claimed is:

1. A process for thickening a fibrous pulp suspension by guiding the suspension between a rigid first face that moves relative to a flexible second face to form a converging draining gap, at least one of the first face and the second face being water permeable, the process comprising:

providing the suspension to be drained;

forming from the suspension a fibrous pulp layer with a solid matter content of at least about 4% on at least one of the first face and the second face;

guiding the fibrous pulp layer having a solid content of at least about 4% into said draining gap;

applying a pressure differential in the draining gap via the second face to thicken the fibrous pulp layer;

the pressure differential formed by stretching the second face and pressing the first face and the second face toward each other to drain water from the fibrous pulp layer; and transporting the thickened fibrous pulp from the draining gap.

2. The process according to claim 1, the fibrous pulp layer having a solid matter content of at least 8% upon entering the draining gap.

3. The process according to claim 1, the second face being perforated.

4. The process according to claim 3, the second face comprising a screen belt.

5. The process according to claim 1, the second face being water impermeable.

6. The process according to claim 1, the first face being water permeable.

7. The process according to claim 1, further comprising:
providing a thin pulp suspension composed of the fibrous pulp suspension to be drained;
transporting the thin pulp suspension by rotational movement of a third face;
pre-draining the thin pulp suspension between the third face and one of the first face and the second face to produce the fibrous pulp layer, at least one of the first face, the second face and the third face being water permeable;
moving the third face and the one of the first face and the second face at substantially the same speed during pre-draining; and
guiding the fibrous pulp layer into the converging draining gap.

8. The process according to claim 7, the thin pulp suspension having a solid matter less than or equal to 2%.

9. The process according to claim 7, the fibrous pulp layer produced during pre-draining having a pulp density of at least 40 g/m² in an oven dry condition.

10. The process according to claim 1, the first face being cylindrical.

11. The process according to claim 10, the second face including a flexible belt, the process comprising passing the flexible belt by a cleaning device.

12. The process according to claim 10, the first face comprising a horizontally arranged cylindrical screen drum.

13. The process according to claim 1, further comprising applying a vacuum in a suction zone that follows the draining gap.

14. The process according to claim 1, the stretched flexible belt being essentially stationary, the process comprising producing relative movement between the first face and the second face by moving the first face.

15. The process according to claim 1, the second face including a flexible belt, the process comprising moving the flexible belt at a speed of less than 10 meters per minute.

16. The process according to claim 1, wherein the second face has a surface designed to increase frictional resistance with the fibrous pulp layer, and further comprising increasing frictional resistance against the fibrous pulp layer with said surface of the second face.

17. A process for thickening a fibrous pulp suspension by guiding the suspension between a rigid first face that moves relative to a flexible second face to form a converging draining gap, comprising:
providing a thin pulp suspension composed of the fibrous pulp suspension to be drained;
transporting the thin pulp suspension by rotational movement of a third face;
pre-draining the thin pulp suspension between the third face and one of the first face and the second face to produce a fibrous pulp layer, at least one of the first face, the second face, and the third face being water permeable;
moving the third face and the one of the first face and the second face at substantially a same speed during pre-draining;
guiding the fibrous pulp layer into the converging draining gap;
applying a pressure differential in the draining gap via the second face to thicken the fibrous pulp layer;
the pressure differential formed by stretching the second face and pressing the first face and the second face toward each other to drain water from the fibrous pulp layer; and
transporting the thickened fibrous pulp from the draining gap.

18. The process according to claim 17, the fibrous pulp layer having a solid matter content of at least about 4% upon entering the draining gap.

19. The process according to claim 17, the second face being perforated.

20. The process according to claim 19, the second face comprising a screen belt.

21. The process according to claim 17, the second face being water impermeable.

22. The process according to claim 17, the first face being water permeable.

23. The process according to claim 17, the thin pulp suspension having a solid matter less than or equal to 2%.

24. The process according to claim 17, the fibrous pulp layer produced during pre-draining having a pulp density of at least 40 g/m².

25. The process according to claim 17, the first face being cylindrical.

26. The process according to claim 25, the second face including a flexible belt, the process comprising passing the flexible belt by a cleaning device.

27. The process according to claim 25, the first face comprising a horizontally positioned cylindrical screen drum.

28. The process according to claim 17, further comprising applying a vacuum in a suction zone that follows the draining gap.

29. The process according to claim 17, wherein the second face has a surface designed to increase frictional resistance with the fibrous pulp layer, and further comprising increasing frictional resistance against the fibrous pulp layer with said surface of the second face.

30. The process according to claim 29, the stretched flexible belt being essentially stationary, the process comprising producing relative movement between the first face and the second face by moving the first face.

31. A device for thickening a fibrous pulp suspension, comprising:
a rigid first face;
a flexible second face;
at least one of the rigid first face and the flexible second face being water permeable;
the fibrous pulp suspension being deposited on at least one of the rigid first face and the flexible second face to form a fibrous pulp layer;
the rigid first face moving relative to the flexible second face to form a converging draining gap for receiving the fibrous pulp layer; and
the flexible second face being stretchable to press the flexible second page toward the rigid first face to drain water from the fibrous pulp layer.

32. The device according to claim 31, a rotating screen belt comprising the flexible second face.

33. The device according to claim 31, further comprising a third face that transports a thin pulp suspension composed of the fibrous pulp suspension to the draining gap, the third face being adapted to receive the thin pulp suspension and to move at substantially a same speed as one of the rigid first face and the flexible second face.

34. The device according to claim 31, a horizontally arranged cylindrical screen drum comprising the rigid first face.

35. The device according to claim 31, a rotating cylinder comprising the third face.

* * * * *